United States Patent
Luk

(10) Patent No.: US 11,756,105 B2
(45) Date of Patent: Sep. 12, 2023

(54) SYSTEM AND METHODS FOR MESSAGE TIMING OPTIMIZATION

(71) Applicant: eBay Inc., San Jose, CA (US)

(72) Inventor: Alpha Kamchiu Luk, San Jose, CA (US)

(73) Assignee: EBAY INC, San Jose, CA (US)

( * ) Notice: Subject to any disclaimer, the term of this patent is extended or adjusted under 35 U.S.C. 154(b) by 16 days.

(21) Appl. No.: 17/209,387

(22) Filed: Mar. 23, 2021

(65) Prior Publication Data

US 2022/0309564 A1 Sep. 29, 2022

(51) Int. Cl.
| | | |
|---|---|---|
| G06Q 30/00 | (2023.01) | |
| G06Q 30/0601 | (2023.01) | |
| H04L 51/046 | (2022.01) | |
| G06N 20/00 | (2019.01) | |

(52) U.S. Cl.
CPC ......... *G06Q 30/0637* (2013.01); *G06N 20/00* (2019.01); *G06Q 30/0631* (2013.01); *H04L 51/046* (2013.01)

(58) Field of Classification Search
CPC ....................................... G06Q 30/0601–0645
USPC ................................................ 705/26.1–27.2
See application file for complete search history.

(56) References Cited

U.S. PATENT DOCUMENTS

| | | | | |
|---|---|---|---|---|
| 10,395,289 | B2 * | 8/2019 | Van der Spoel | ....... G06Q 30/00 |
| 10,423,962 | B2 | 9/2019 | Faith et al. | |
| 10,891,678 | B1 * | 1/2021 | Muralidharan | ......... G06F 7/026 |
| 11,288,729 | B1 * | 3/2022 | Johnson | ............... G06Q 20/202 |
| 2012/0036037 | A1 * | 2/2012 | Xiao | ..................... G06Q 30/00 |
| | | | | 705/26.7 |
| 2014/0207570 | A1 * | 7/2014 | Cancro | .............. G06Q 30/0261 |
| | | | | 705/26.7 |
| 2015/0032602 | A1 | 1/2015 | Blackhurst et al. | |
| 2018/0247354 | A1 * | 8/2018 | Pratt | ....................... H04L 47/10 |
| 2020/0410573 | A1 * | 12/2020 | Kraus | ................ G06Q 30/0631 |
| 2021/0241353 | A1 * | 8/2021 | Sridhar | .............. G06Q 30/0631 |

(Continued)

OTHER PUBLICATIONS

Droomer, M., and J. Bekker. "Using Machine Learning to Predict the Next Purchase Date for an Individual Retail Customer." South African Journal of Industrial Engineering 31.3 (2020): 69-82. ProQuest. Web. Jun. 1, 2022. (Year: 2020).*

(Continued)

*Primary Examiner* — Michael Misiaszek
*Assistant Examiner* — Kennedy Gibson-Wynn
(74) *Attorney, Agent, or Firm* — SCHWEGMAN LUNDBERG & WOESSNER, P.A.

(57) ABSTRACT

Disclosed are systems, methods, and non-transitory computer-readable media for message timing optimization. A message timing optimization system determines optimized times to transmit messages to users based on historical transaction data. For example, the message timing optimization system may determine an optimal time to transmit a recommendation message to a user to perform a subsequent, such as repurchasing an item, refreshing a password, and the like. The message timing optimization system uses historical transaction data describing previous transactions performed by the user and/or other users to determine probability values indicating the likelihood that a user will perform a subsequent action at various time periods after the user performed an initial transaction.

18 Claims, 8 Drawing Sheets

(56) References Cited

U.S. PATENT DOCUMENTS

2021/0272181 A1* 9/2021 Mitra .................. G06F 16/9535
2021/0326674 A1* 10/2021 Liu .......................... G06N 3/04

OTHER PUBLICATIONS

Deligiannis, Alexandros, Charalampos Argyriou, and Dimitrios Kourtesis. "Predicting the Optimal Date and Time to Send Personalized Marketing Messages to Repeat Buyers." International Journal of Advanced Computer Science and Applications 11.4 (2020): n/a. ProQuest. Web. Jun. 1, 2022. (Year: 2020).*

Dawes, John G. "Price Promotions: Examining the Buyer Mix and Subsequent Changes in Purchase Loyalty." The Journal of Consumer Marketing 35.4 (2018): 366-76. ProQuest. Web. Dec. 24, 2022. (Year: 2018).*

Cadez, Igor V., Padhraic Smyth, and Heikki Mannila. "Probabilistic modeling of transaction data with applications to profiling, visualization, and prediction." Proceedings of the seventh ACM SIGKDD international conference on Knowledge discovery and data mining. 2001. (Year: 2001).*

* cited by examiner

SYSTEM AND METHODS FOR MESSAGE TIMING OPTIMIZATION

TECHNICAL FIELD

An embodiment of the present subject matter relates generally to messages and, more specifically, to message timing optimization.

BACKGROUND

Electronic communications have communicating quick and easy. As opposed to sending a message using traditional mail that may take several days to deliver, an email is delivered almost instantaneously and without need for paper, envelopes, and stamps. While electronic communications have improved the ease and speed at which messages are sent, they may also result in over messaging that dilutes the value of the messages and/or annoys the message recipients. As a result, the messages may be ignored by the recipients. Limiting the number of messages that are sent can therefore increase the likelihood that the messages are read rather than ignored, but also presents a challenge related to selecting an optimal time to send the messages. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
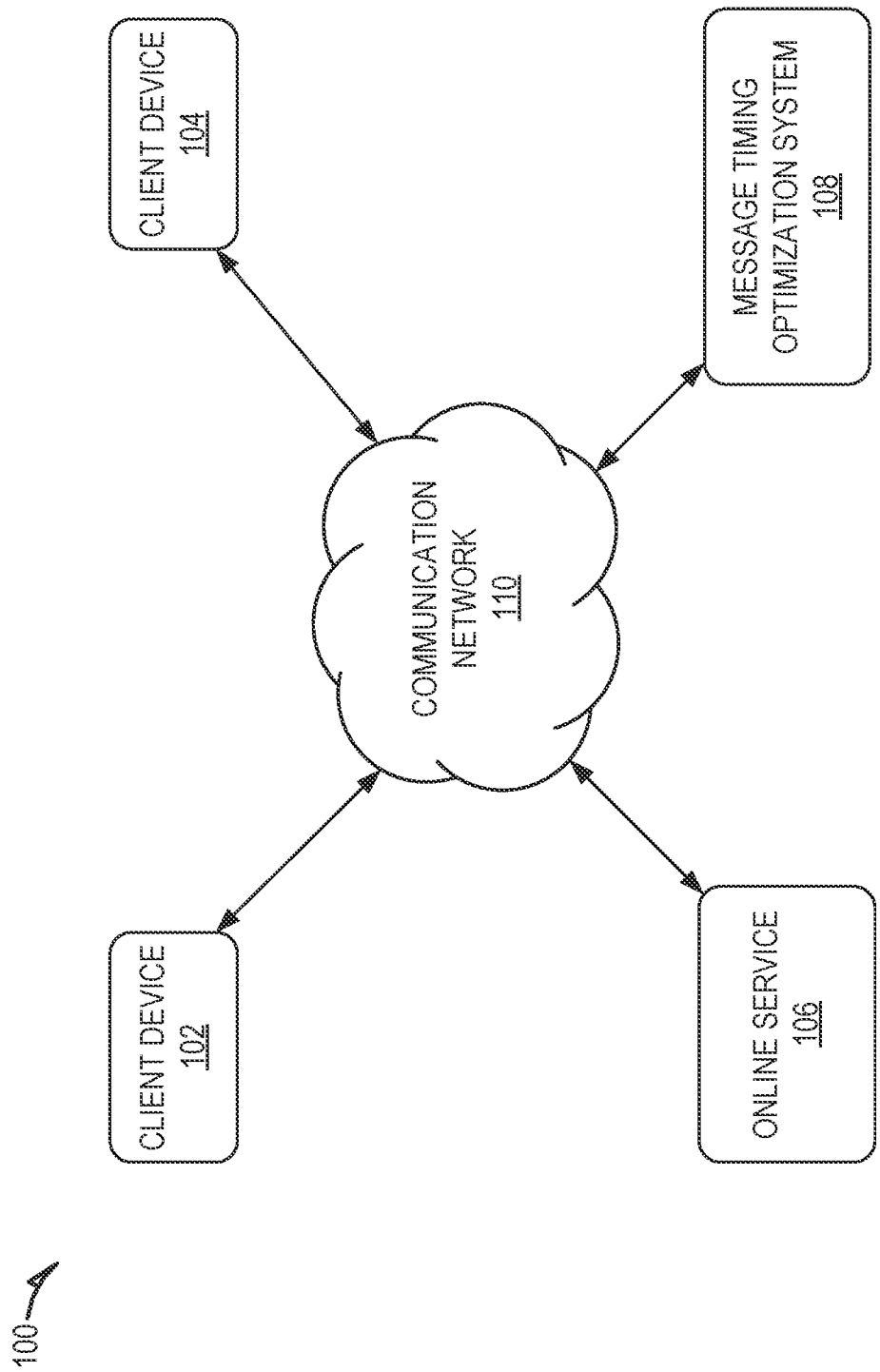
FIG. 1 shows a system for message timing optimization, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for message timing optimization. A message timing optimization system determines optimized times to transmit messages to users based on historical transaction data. For example, the message timing optimization system may determine an optimal time to transmit a recommendation message to a user to perform a subsequent, such as repurchasing an item, refreshing a password, and the like. The message timing optimization system uses historical transaction data describing previous transactions performed by the user and/or other users to determine probability values indicating the likelihood that a user will perform a subsequent action at various time periods after the user performed an initial transaction. For example, the message timing optimization system may determine probability values indicating the likelihood that a user that purchased an item (e.g., initial transaction) will repurchase the item (e.g., subsequent transaction) at various time periods, such as between 30-60 days after the initial purchase, between 60-90 days after the initial purchase, and so on.

The message timing optimization system uses the determined probability values to determine a time period in which the user is likely to perform the subsequent transaction. For example, the message timing optimization system may identify the time period associated with the highest probability value as being the time period in which the user is likely to perform the subsequent transaction. The message timing optimization system may then determine a recommendation time to transmit a recommendation message to the user based on the identified time period. For example, the message timing optimization system may determine a recommendation time that is prior to the identified time period with the intention of providing the message to the user before the user performs the subsequent transaction.

A recommendation message may be transmitted to the user at the determined recommendation time. The recommendation message may recommend and/or remind the user to perform the subsequent transaction. Using the message timing optimization system to determine an optimized time to send a message provides a number of benefits. From a technical perspective, determining an optimized time to send a message reduces the reduces the number of messages that are transmitted, which reduces computing resource usage and associated network latency. Reducing the number of messages may also increase the effectiveness of the transmitted message. For example, limiting the number of messages that are sent can increase the likelihood that the messages are read rather than ignored by their recipient.

FIG. 1 shows a system 100 for message timing optimization, according to some example embodiments. As shown, multiple devices (i.e., client device 102, client device 104, online service 106, and message timing optimization system 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the online service 106 to utilize the services provided by the online service 106. The online service 106 may provide any of a variety of different types of online services, such as an online marketplace, vehicle reservation service, travel reservation service, and the like. For example, the online service may provide listings for items and/or services, which users may purchase and/or reserve. In some embodiments, the online service 106 may provide an online marketplace that enables users to post listings offering items for sale, as well as purchase items posted for sale by other users. For example, the online service 106 may provide listings for items being auctioned for sale and/or items listed for sale at a set price. Alternatively, the online service 106 may provide listings that are associated with items and/or services provided by the online service 106, such as listings to purchase items, reserve flights, and the like. In any case, users communicate with and utilize the functionality of the online service 106 by using the client devices 102 and 104 that are connected to the communication network 110 by direct and/or indirect communication.

Although the shown system 100 includes only two client devices 102, 104, this is only for ease of explanation and is not meant to be limiting. One skilled in the art would appreciate that the system 100 can include any number of client devices 102, 104. Further, the online service 106 may concurrently accept connections from and interact with any number of client devices 102, 104. The online service 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the online service 106 via a client-side application installed on the client devices 102 and 104. In some embodiments, the client-side application includes a component specific to the online service 106. For example, the component may be a stand-alone application, one or more application plug-ins, and/or a browser extension. However, the users may also interact with the online service 106 via a third-party application, such as a web browser, that resides on the client devices 102 and 104 and is configured to communicate with the online service 106. In either case, the client-side application presents a user interface (UI) for the user to interact with the online service 106. For example, the user interacts with the online service 106 via a client-side application integrated with the file system or via a webpage displayed using a web browser application.

As explained earlier, the online service 106 is one or more computing devices configured to facilitate an online service. For example, the online service 106 may provide an online marketplace (e.g., EBAY, AMAZON, etc.), travel service, and the like. In any case, the online service 106 enables its users to perform transactions, such as purchasing an item, reserving services, and the like. For example, the online service 106 provides a user interface in which users may view listings for items and/or services that may be purchases and/or reserved. Each listing provides details for an item or service listed for sale. For example, the listing may include a description, images, sale price, and the like.

The online service 106 may further provide functionality that enables a user to perform transaction, such as purchasing a listed item or service. For example, the online service 106 may provide user interface elements (e.g., buttons, text fields, etc.) that a user may use to purchase an item/service, submit an offer, etc., as well as provide their financial (e.g., credit card number, bank account number) and personal information (e.g., shipping address, billing address, etc.) to complete the purchase.

In many cases, a user that performs a transaction may subsequently perform a corresponding subsequent transaction. For example, a user that purchases an item (e.g., shoes) may repurchase the item at a later date (e.g., buys another pair of shoes). As another example, a user that reserves services (e.g., scheduled carpet cleaning) will subsequently reserve the services again (e.g., schedule subsequent carpet cleaning. As another example, a user that purchases an item (e.g., a car) may subsequently reserve services related to the item (e.g., schedule an oil change).

The online service 106 may provide users with recommendation messages to perform a subsequent transaction. For example, the recommendation message may provide a reminder to perform the subsequent transaction as well as a link to cause performance of the subsequent transaction and/or provide related information. As explained earlier, the use of electronic communications have result in over messaging that dilutes the value of the messages and/or annoys the message recipients. As a result, the messages may be ignored by the recipients. To alleviate this issue, the online service 106 utilizes the functionality of the message timing optimization system 108 to determines optimized times to transmit messages to users based on historical transaction data. Limiting the number of messages that are transmitted to users not only reduces resource usage and associated latency, but can also increase the likelihood that the messages are read, rather than ignored, by their recipients.

The message timing optimization system 108 uses historical transaction data describing previous transactions performed by the user and/or other users to determine probability values indicating the likelihood that a user will perform a subsequent action at various time periods after the user performed an initial transaction. For example, the message timing optimization system may access the historical transaction data from the online service 106 and/or maintain the historical transaction data. The probability values determined by the message timing optimization system 108 indicate the likelihood that a user will perform a subsequent transaction at various time periods after completing an initial transaction. For example, the probability values may include a probability value indicating the likelihood that the user will perform the subsequent transaction in 30-60 days after completing the initial transaction, another probability value indicating the likelihood that the user will perform the subsequent transaction between 60-90 days after completing the initial transaction, and so on.

The message timing optimization system 108 may determine the probability values in a number of ways. For example, in some embodiments, the message timing optimization system 108 generates a distribution model based on the historical transaction data that includes the probability values. As another example, the message timing optimization system 108 may train a machine learning model based on the historical transaction data. The trained machine learning model may be a model, such as a classification model, that provides probability values to a set of labels based on a given input. For example, the set of labels may be associated with the various periods of time and the machine learning model may provides an output indicating the probability associated with each period of time.

In any case, the message timing optimization system 108 uses the determined probability values to determine a time period in which the user is likely to perform the subsequent transaction. For example, the message timing optimization system 108 may identify the time period associated with the highest probability value as being the time period in which the user is likely to perform the subsequent transaction. The message timing optimization system 108 may then determine a recommendation time to transmit a recommendation message to the user based on the identified time period. For example, the message timing optimization system 108 may determine a recommendation time that is prior to the identified time period, such as a predetermined number of days prior. Selecting a recommendation time that is prior to the determined period of time allows for the message to be provided to the user prior to the user having performed the subsequent transaction.

The message timing optimization system 108 and/or the online service 106 may transmit a recommendation message to the user at the determined recommendation time. The recommendation message may recommend and/or remind the user to perform the subsequent transaction. For example, the recommendation message may include user interface elements, such as buttons, that enable the user to view listings hosted by the online service 106 that offer the item for sale.

Figure 2:
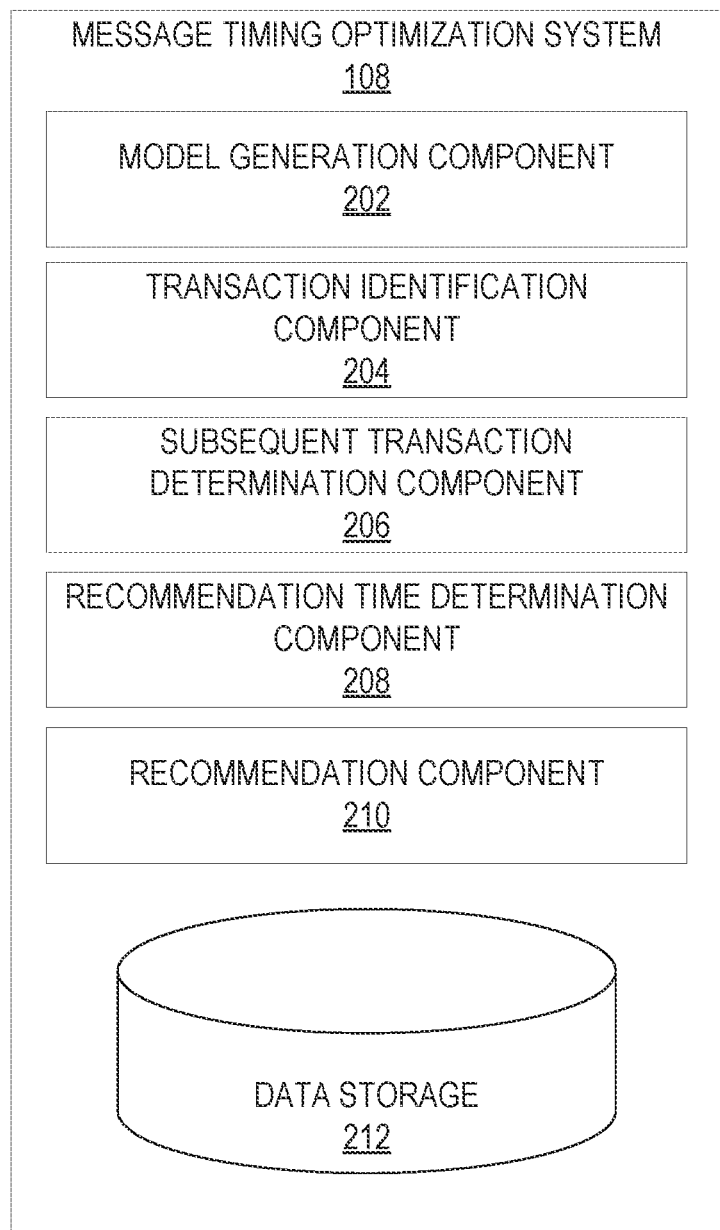
FIG. 2 is a block diagram of a message timing optimization system, according to some example embodiments.

FIG. 2 is a block diagram of a message timing optimization system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the message timing optimization system 108 to facilitate additional functionality that is not specifically described herein. Furthermore, the various functional modules depicted in FIG. 2 may reside on a single computing device or may be distributed across several computing devices in various arrangements such as those used in cloud-based architectures. For example, the various functional modules and components may be distributed amongst computing devices that facilitate both the message timing optimization system 108 and the online service 106.

As shown, the message timing optimization system 108 includes a model generation component 202, a transaction identification component 204, a subsequent transaction determination component 206, a recommendation time determination component 208, a recommendation component 210, and a data storage 212.

The model generation component 202 generates a model used to determine the probability values indicating the likelihood that a subsequent transaction will occur in various time periods. The model generation component 202 generates the model based on historical transaction data. The historical transaction data may include data describing previous transaction performed using the online service 106, such as data describing previous purchases made by users of the online services 106 for items and/or services. The historical transaction data may include data identifying the users and/or accounts associated with the transactions, the dates/times when the transactions occurred, the type of transaction that occurred, listings associated with the transactions, and the like. The model generation component 202 may access the historical transaction data from the online service 106 and/or from the data storage 212.

The model generation component 202 uses the historical transaction data to generate a model used to determine the probability values indicating the likelihood that a subsequent transaction will occur in various time periods. For example, the model may be a distribution model, such as a probability distribution, that indicates the probability of the subsequent occurrence being performed based on time. As another example, the model may be a machine learning model, such as a classification model, that assigns probability values to various classification labels based on a given input.

The model generation component 202 may generate a model for a given item, category of items, and/or combination of items. For example, the model generation component 202 may use historical transaction data describing transactions associated with a specific item, such as purchases of a specific item, to generate a model that is specific to the item. In this type of embodiment, the model generation component 202 may generate different individual models for use when determining probability values associated with various items.

As another example, the model generation component 202 may use historical transaction data describing transactions associated with a category of items, such as purchases of a multiple items with the category, to generate a model that is specific to the category of items. In this type of embodiment, the model generation component 202 may generate different individual models for use when determining probability values associated with different categories of items.

In some embodiments, the model generation component 202 may generate a model that is specific to a particular user.

For example, the model generation component 202 may place higher weight on historical transaction data associated with the user when generating the model. The resulting model will therefore provide results that are more targeted to a the particular user.

The model generation component 202 may store the generated models in the data storage 212, where they can be accessed by the other components of the message timing optimization system 108. The model generation component 202 may also periodically update the generated models based on new historical transaction data. For example, the model generation component 202 may access the stored models from the data storage 212 and update the models (e.g., retrain) the model based on additional historical transaction data accessed from the online service 106 and/or data storage 212.

The transaction identification component 204 identifies accounts of the online service 106 that have completed a transaction for purposes of transmitting a recommendation to perform a subsequent transaction. For example, the transaction identification component 204 may identify accounts that performed specified transactions, such as purchasing items, reserving services, and the like. The transaction identification component 204 identifies the accounts that completed a transaction based on transaction data describing transactions performed using the online service 106. For example, the transaction identification component 204 may access the transaction data from the online service 106 and/or from the data storage 212.

In some embodiments, the transaction identification component 204 may identify transactions associated with specified items and/or services. For example, the transaction identification component 204 may limit the search to purchases of specific items that are predetermined to be likely to result in a subsequent transaction or for which a model has been generated and stored in the data storage 212. Similarly, the transaction identification component 204 may limit the search to transactions associated with specified categories of items or services. The transaction identification component 204 may provide data identifying the identified user accounts to the other components of the message timing optimization system 108 and/or record the identified user accounts in a log stored in the data storage. The data shared with the other components and/or recorded in the log may include data identifying the user account, such as a unique account identifier, and data describing the transaction. For example, the data may include a date/time of the transaction, the type of transaction, an item and/or service associated with the transaction (e.g., purchased item or service), and the like.

The subsequent transaction determination component 206 determines a time period when a subsequent transaction is likely to occur. The time period may be relative to a day/time when the initial transaction occurred. For example, the time period may be a time period such as 30-60 days after occurrence of the initial transaction, 60-90 days after occurrence of the initial transaction, and so on. The subsequent transaction determination component 206 determines the time period based on a set of probability values calculated for a predetermined set of time periods. Each probability value indicates the likelihood that the subsequent transaction will occur during a corresponding time period. For example, the probability values may include a probability value indicating the likelihood that the user will perform the subsequent transaction in 30-60 days after completing the initial transaction, another probability value indicating the likelihood that the user will perform the subsequent transaction between 60-90 days after completing the initial transaction, and so on.

The subsequent transaction determination component 206 may determine the probability values in a number of ways. For example, in some embodiments, the subsequent transaction determination component 206 uses a distribution model stored in the data storage 212 to determine the set of probability values. In this type of embodiments, the subsequent transaction determination component 206 accesses a distribution model that corresponds to an item/service or category of items/services that are associated with the initial transaction. For example, the subsequent transaction determination component 206 may access a distribution model that corresponds to an item that was purchased as part of the initial transaction. The distribution model that corresponding to an item or service is a distribution model that was generated based on historical transaction data describing previous transactions associated with the item or service. For example, the distribution model was generated based on historical transaction data describing previous purchases of the item or service.

The distribution model indicates the probability values over time. Accordingly, the subsequent transaction determination component 206 accesses the probability values that the subsequent transaction will occur from the distribution model.

In some embodiments, the subsequent transaction determination component 206 determines the probability values using a trained machine learning model. The trained machine learning model may be a model, such as a classification model, that provides probability values to a set of labels based on a given input. For example, the set of labels may be associated with the various periods of time and the machine learning model generates an output indicating the probability associated with each period of time. In this type of embodiments, the subsequent transaction determination component 206 generates an input based on data describing an initial transaction and uses the generated input as input into the appropriate machine learning model. The input may be a representative vector (e.g., feature vector) generated based on a predetermined set of features describing the initial transaction, such as the item/service that was purchased, date/time of the initial transaction, and the like. The representative vector may also be generated based on features describing the user account that performed the initial transaction, such data describing the transaction history of the account, geographic location associated with the account, and the like. Providing the generated input as input into the machine learning model results in the set of probability values.

In either case, the subsequent transaction determination component 206 uses the determined probability values to determine a time period in which the subsequent transaction is likely to occur. For example, the subsequent transaction determination component 206 may identify the time period associated with the highest probability value as being the time period in which the subsequent transaction is likely to occur. The subsequent transaction determination component 206 may provide data identifying the determined time period to the other components of the message timing optimization system 108.

The recommendation time determination component 208 determines a recommendation time to transmit a recommendation message to a user based on the time period identified by the subsequent transaction determination component 206. For example, the recommendation time determination component 208 may determine a recommendation time that is prior to the identified time period, such as a predetermined number of days prior to the beginning of the time period. Selecting a recommendation time that is prior to the determined period of time allows for the message to be provided to the user prior to the user having performed the subsequent transaction.

The recommendation component 210 transmit a recommendation message to the user at the determined recommendation time. The recommendation message may recommend and/or remind the user to perform the subsequent transaction. For example, the recommendation message may include user interface elements, such as buttons, that enable the user to view listings hosted by the online service 106 that offer the item for sale.

Figure 3:
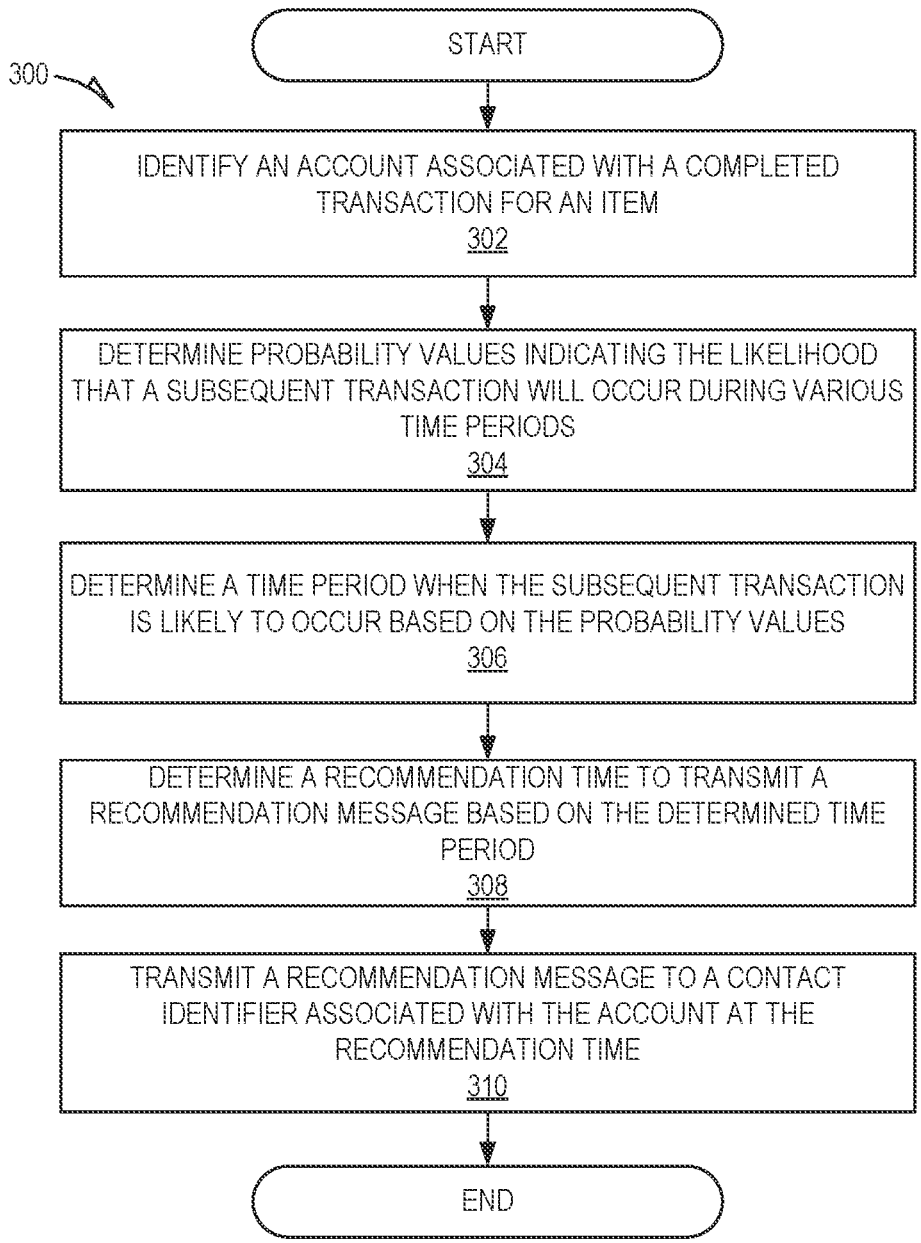
FIG. 3 is a flowchart showing a method of message timing optimization, according to certain example embodiments.

FIG. 3 is a flowchart showing a method 300 of message timing optimization, according to certain example embodiments. The method 300 may be embodied in computer readable instructions for execution by one or more processors such that the operations of the method 300 may be performed in part or in whole by the message timing optimization system 108; accordingly, the method 300 is described below by way of example with reference thereto. However, it shall be appreciated that at least some of the operations of the method 300 may be deployed on various other hardware configurations and the method 300 is not intended to be limited to the message timing optimization system 108.

At operation 302, the transaction identification component 204 identifies an account associated with a completed transaction for an item. For example, the transaction identification component 204 may identify accounts that performed specified transactions, such as purchasing items, reserving services, and the like. The transaction identification component 204 identifies the accounts that completed a transaction based on transaction data describing transactions performed using the online service 106. For example, the transaction identification component 204 may access the transaction data from the online service 106 and/or from the data storage 212.

At operation 304, the subsequent transaction determination component 206 determines probability values indicating the likelihood that a subsequent transaction will occur during various time periods. Each probability value indicates the likelihood that the subsequent transaction will occur during a corresponding time period. For example, the probability values may include a probability value indicating the likelihood that the user will perform the subsequent transaction in 30-60 days after completing the initial transaction, another probability value indicating the likelihood that the user will perform the subsequent transaction between 60-90 days after completing the initial transaction, and so on.

The subsequent transaction determination component 206 may determine the probability values in a number of ways. For example, in some embodiments, the subsequent transaction determination component 206 uses a distribution model stored in the data storage 212 to determine the set of probability values.

In some embodiments, the subsequent transaction determination component 206 determines the probability values using a trained machine learning model. The trained machine learning model may be a model, such as a classification model, that provides probability values to a set of labels based on a given input. For example, the set of labels may be associated with the various periods of time and the machine learning model generates an output indicating the probability associated with each period of time. In this type of embodiments, the subsequent transaction determination component 206 generates an input based on data describing an initial transaction and uses the generated input as input into the appropriate machine learning model. The input may be a representative vector generated based on a predetermined set of features describing the initial transaction, such as the item/service that was purchased, date/time of the initial transaction, and the like. The representative vector may also be generated based on features describing the user account that performed the initial transaction, such data describing the transaction history of the account, geographic location associated with the account, and the like. Providing the generated input as input into the machine learning model results in the set of probability values.

At operation 306, the subsequent transaction determination component 206 determines a time period when the subsequent transaction is likely to occur based on the probability values. For example, the subsequent transaction determination component 206 may identify the time period associated with the highest probability value as being the time period in which the subsequent transaction is likely to occur. The subsequent transaction determination component 206 may provide data identifying the determined time period to the other components of the message timing optimization system 108.

At operation 308, the recommendation time determination component 208 determines a recommendation time to transmit a recommendation message based on the determined time period. The recommendation time determination component 208 determines a recommendation time to transmit a recommendation message to a user based on the time period identified by the subsequent transaction determination component 206. For example, the recommendation time determination component 208 may determine a recommendation time that is prior to the identified time period, such as a predetermined number of days prior to the beginning of the time period. Selecting a recommendation time that is prior to the determined period of time allows for the message to be provided to the user prior to the user having performed the subsequent transaction.

At operation 310, the recommendation component 210 transmits a recommendation message to a contact identifier associated with the account at the recommendation time. The recommendation message may recommend and/or remind the user to perform the subsequent transaction. For example, the recommendation message may include user interface elements, such as buttons, that enable the user to view listings hosted by the online service 106 that offer the item for sale.

Figure 4:
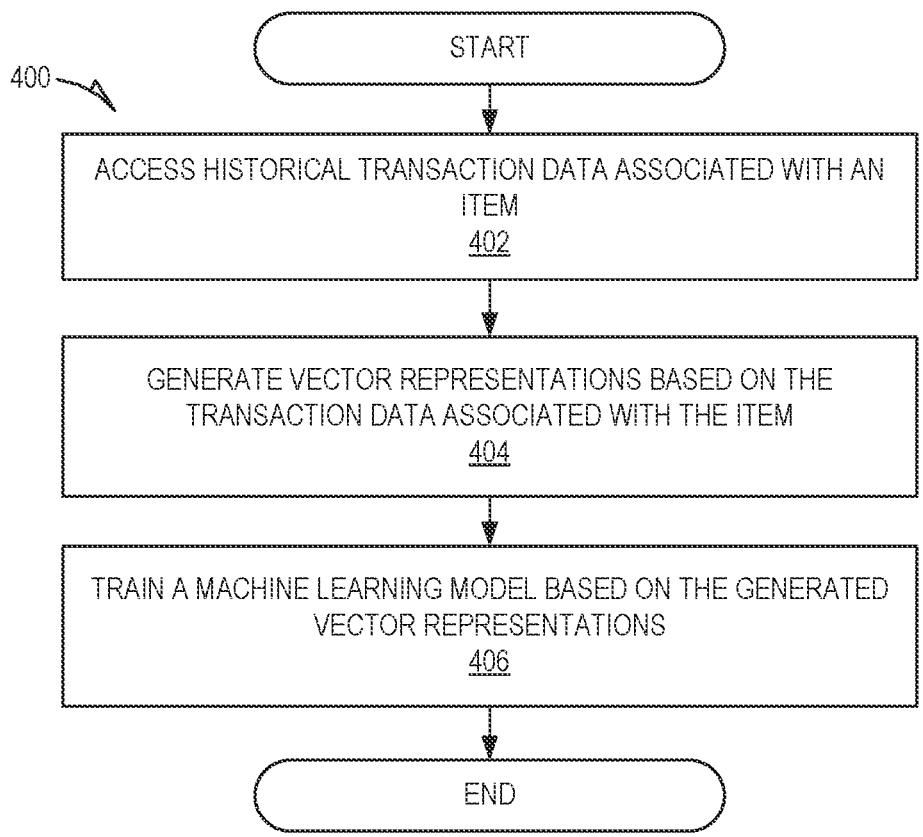
FIG. 4 is a flowchart showing a method of training a machine learning model for determining probability values, according to certain example embodiments.

FIG. 4 is a flowchart showing a method 400 of training a machine learning model for determining probability values, according to certain example embodiments. The method 400 may be embodied in computer readable instructions for execution by one or more processors such that the operations of the method 400 may be performed in part or in whole by the message timing optimization system 108; accordingly, the method 400 is described below by way of example with reference thereto. However, it shall be appreciated that at least some of the operations of the method 400 may be deployed on various other hardware configurations and the method 400 is not intended to be limited to the message timing optimization system 108.

At operation 402, the model generation component 202 accesses historical transaction data associated with an item. The historical transaction data may include data describing previous transaction performed using the online service 106, such as data describing previous purchases made by users of the online services 106 for items and/or services. The historical transaction data may include data identifying the users and/or accounts associated with the transactions, the dates/times when the transactions occurred, the type of transaction that occurred, listings associated with the transactions, and the like. The model generation component 202 may access the historical transaction data from the online service 106 and/or from the data storage 212.

At operation 404, the model generation component 202 generates vector representations based on the transaction data associated with the item. Each vector representations may be generated based on a predetermined set of features describing transactions associated with an account that are related to the item. For example, a vector representation may include data indicating the item that was purchased, date/time of each transaction (e.g., initial transaction, subsequent transactions), and the like. The representative vector may also be generated based on features describing the user account that performed the transactions, such data describing the transaction history of the account, geographic location associated with the account, and the like.

At operation 406, the model generation component 202 trains a machine learning model based on the generated vector representations. The resulting trained machine learning model assigns probability values to various classification labels corresponding to time periods based on the given input. For example, the input may be a representative vector generated based on similar feature data used to train the machine learning model.

Figure 5:
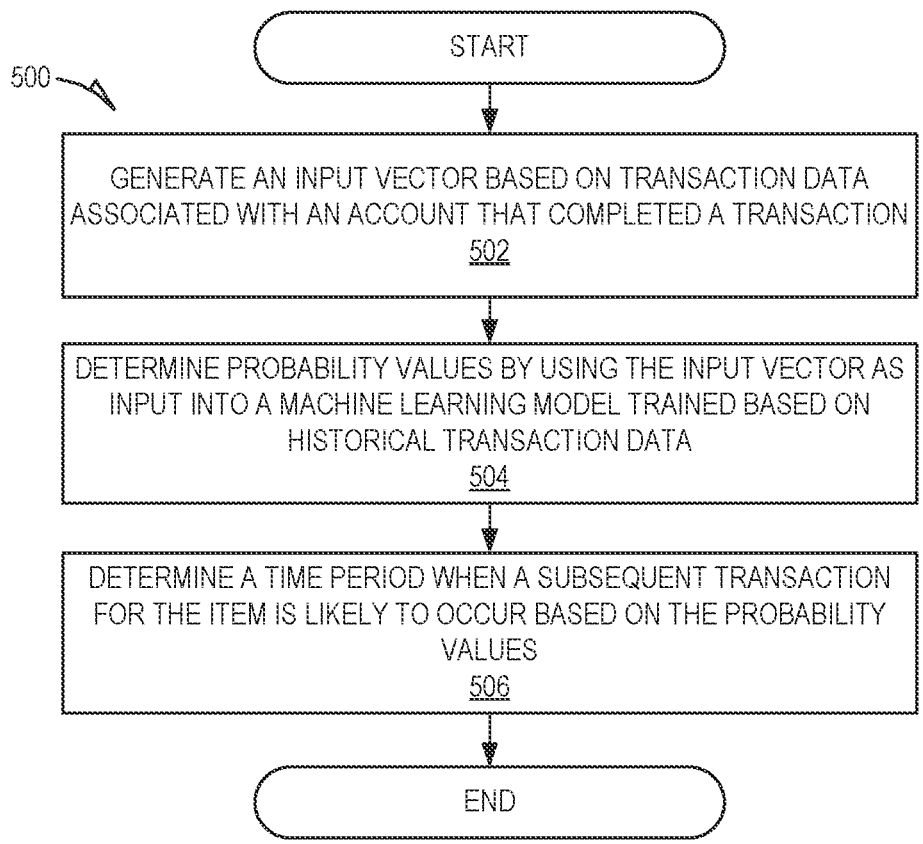
FIG. 5 is a flowchart showing a method of determining probability values using a machine learning model, according to certain example embodiments.

FIG. 5 is a flowchart showing a method 500 of determining probability values using a machine learning model, according to certain example embodiments. The method 500 may be embodied in computer readable instructions for execution by one or more processors such that the operations of the method 500 may be performed in part or in whole by the message timing optimization system 108; accordingly, the method 500 is described below by way of example with reference thereto. However, it shall be appreciated that at least some of the operations of the method 500 may be deployed on various other hardware configurations and the method 500 is not intended to be limited to the message timing optimization system 108.

At operation 502, the subsequent transaction determination component 206 generates an input vector based on transaction data associated with an account that completed a transaction. The input may be a representative vector (e.g., feature vector) generated based on a predetermined set of features describing an initial transaction, such as the item/service that was purchased, date/time of the initial transaction, and the like. The input vector may also be generated based on features describing the user account that performed the initial transaction, such data describing the transaction history of the account, geographic location associated with the account, and the like.

At operation 504, the subsequent transaction determination component 206 determines probability values by using the input vector as input into a machine learning model trained based on the historical transaction data. Providing the generated input as input into the machine learning model results in the set of probability values.

At operation 506, the subsequent transaction determination component 206 determines a time period when the subsequent transaction for the item is likely to occur based on the probability values. For example, the subsequent transaction determination component 206 may identify the time period associated with the highest probability value as being the time period in which the subsequent transaction is likely to occur.

Figure 6:
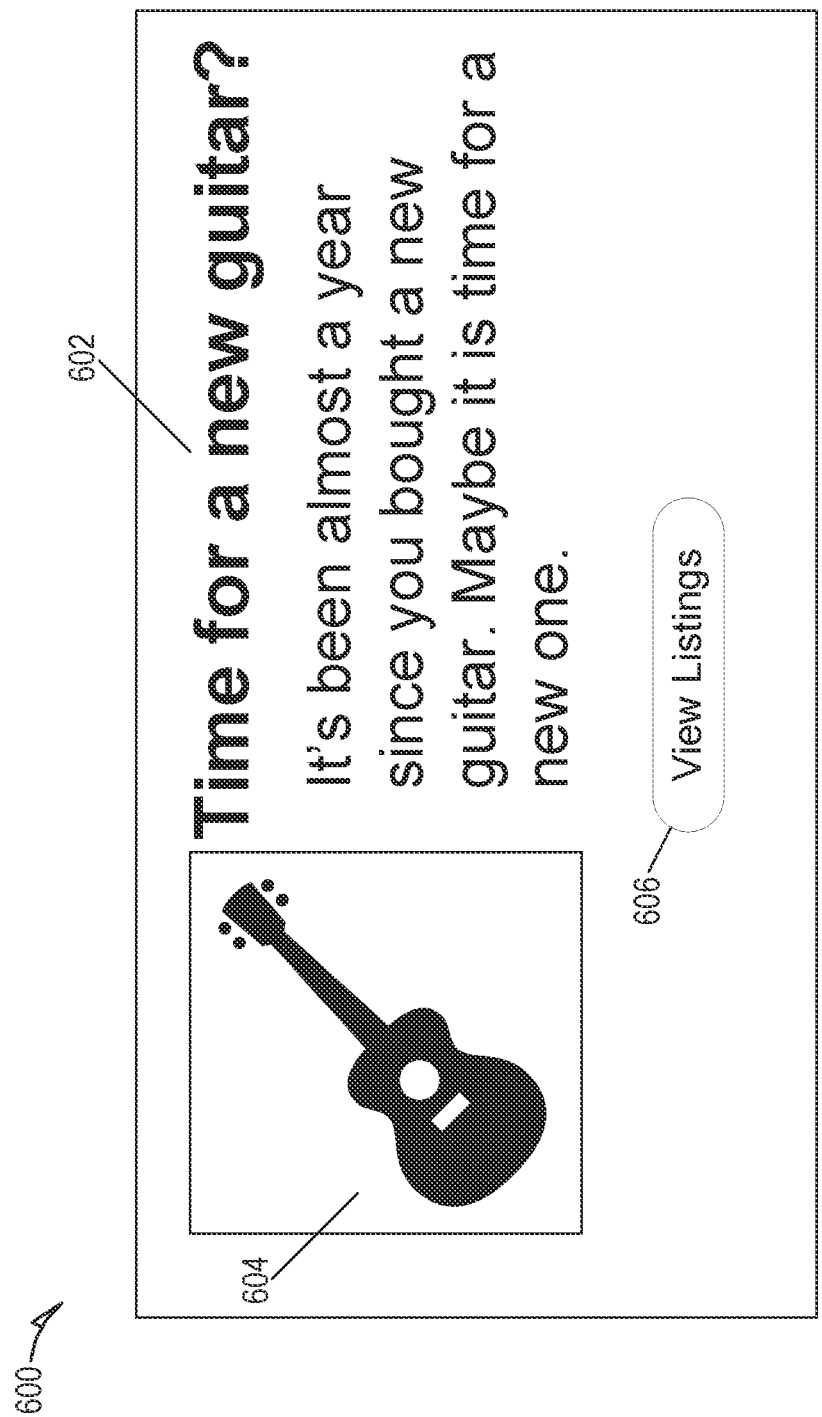
FIG. 6 shows a recommendation message transmitted at an optimized time, according to some example embodiments.

FIG. 6 shows a recommendation message 600 transmitted at an optimized time, according to some example embodiments. As shown, the recommendation message 600 includes a text message 602 reminding the user that it may be time to buy a new guitar. The text message 602 also indicates that it has been almost a year since the user last purchased a guitar. The recommendation message 600 also includes an image 604 of the item. The recommendation message 600 also includes a view listings button 606 that enables the user to view listings offering the item for sale. A user that is interested in viewing listings of the item may select the view listing button 606 to cause the user's client device 102 to present listings for the item. For example, selection of the view listing button 606 may cause the user's client device 102 to communicate with the online service 106 and access listing data for listings of the item, which may then be presented on a display of the client device 102.

Software Architecture

Figure 7:
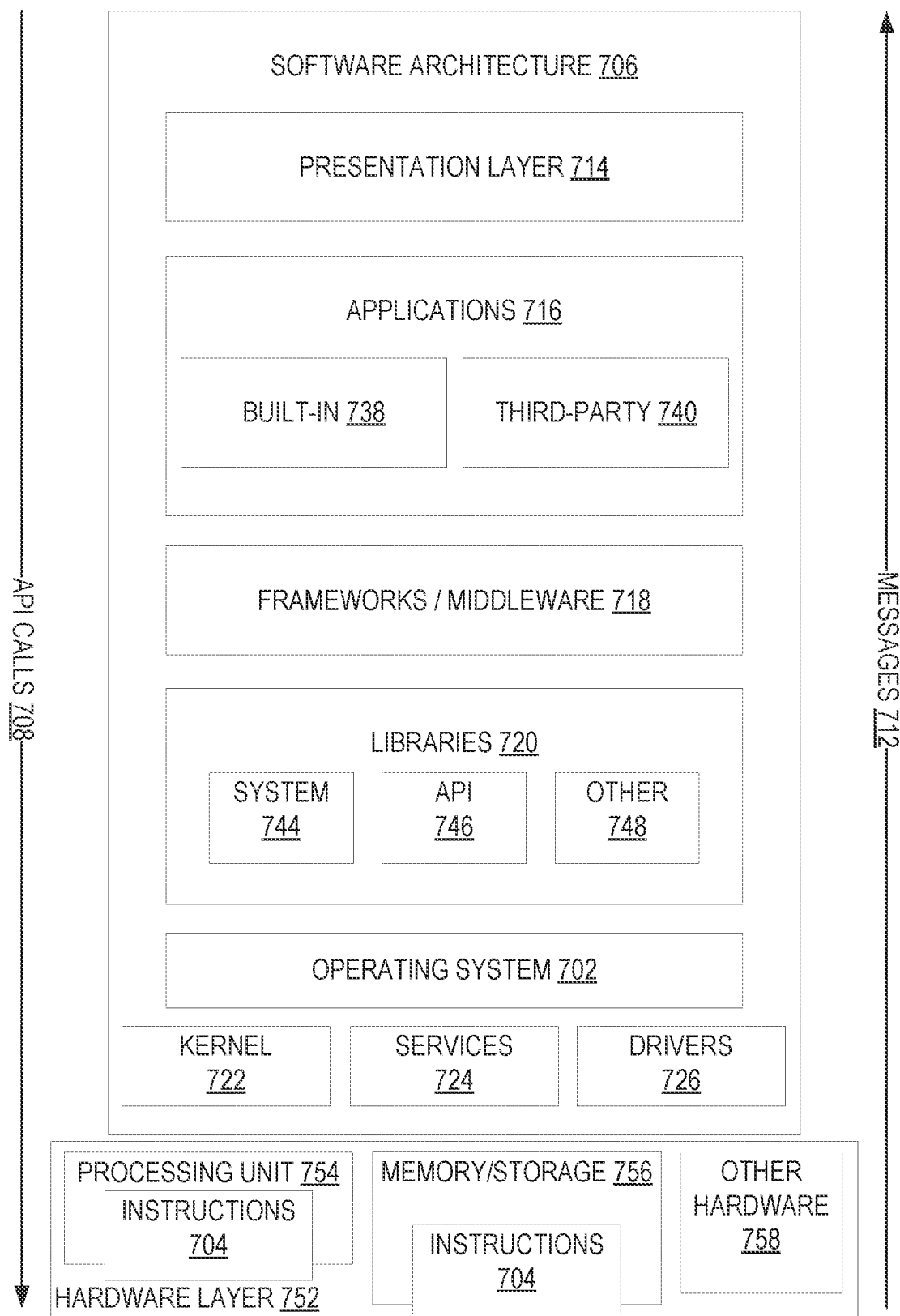
FIG. 7 is a block diagram illustrating a representative software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke Application Programming Interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
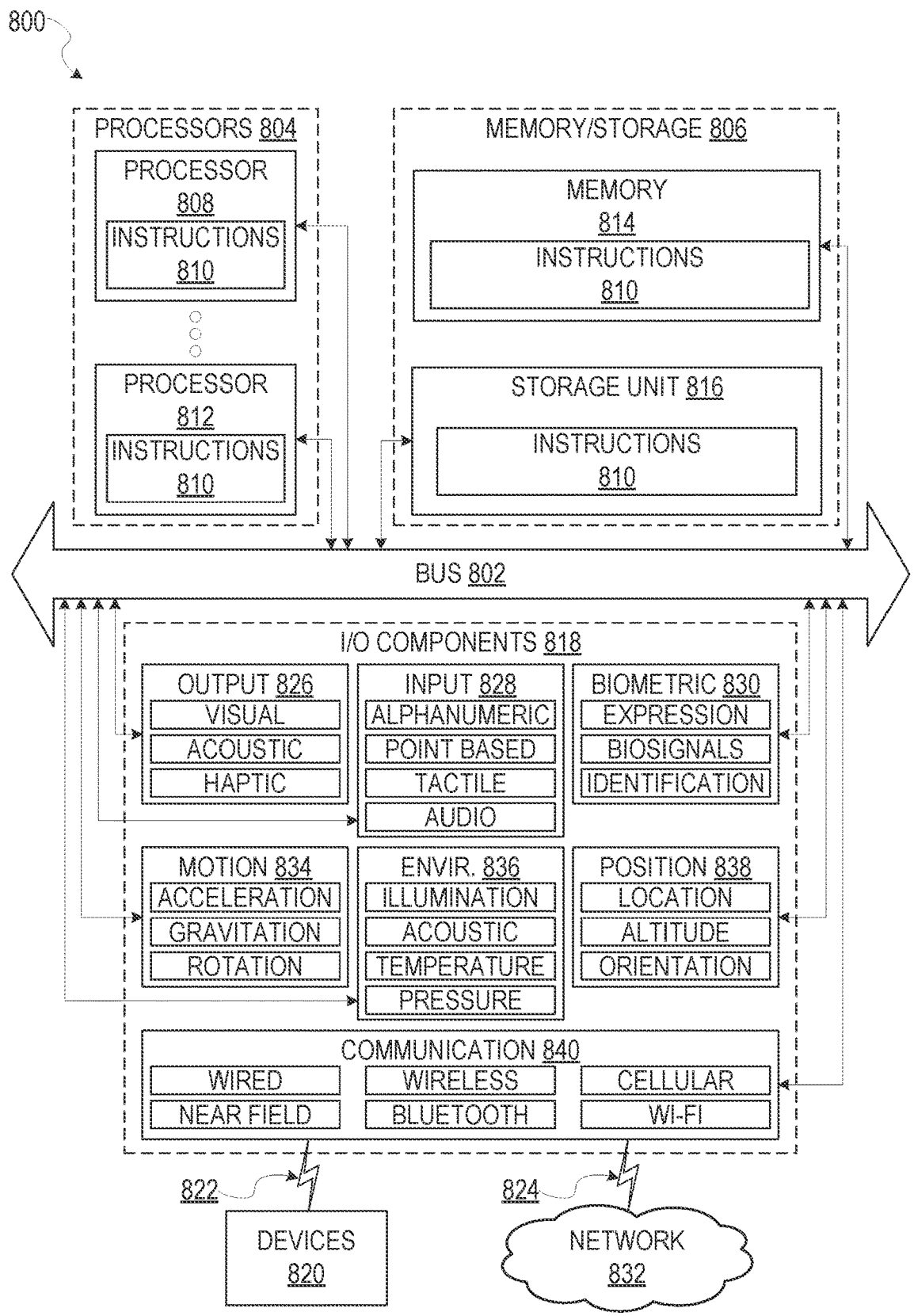
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 (e.g., processors 808, 812) such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a computer processor or a group of computer processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 (e.g., computer processor) configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 804 (sometimes referred to as "cores") that may execute instructions 810 contemporaneously.

What is claimed is:

1. A method, performed by one or more processors, comprising:
    training, using historical transaction data, a user-specific machine learning model that identifies probability values for a subsequent transaction by a user to occur at various periods of time, the training including generating vector representations based on the historical transaction data, historical transaction data associated with an account of the user being weighted higher for the training one or more of the vector representations being generated based on features describing the account including a geographic location associated with the account;
    identifying the account as being associated with a completed transaction for an item, the completed transaction having occurred at a transaction time;
    applying data associated with the completed transaction to the user-specific machine learning model to determine a first probability value and a second probability value, the first probability value indicating a likelihood that the account will perform the subsequent transaction associated with the item during a first period of time after the transaction time and the second probability value indicating a likelihood that the account will perform the subsequent transaction associated with the item during a second period of time after the transaction time;
    determining, based on the first probability value being a highest probability value compared to the second probability value, that the subsequent transaction for the item is likely to be performed by the account during the first period of time after the transaction time;
    determining a recommendation time to transmit a recommendation based on the first period of time and the transaction time;
    transmitting a recommendation message to a contact identifier associated with the account at the recommendation time, the recommendation message providing a recommendation to perform the subsequent transaction for the item; and
    retraining the user-specific machine learning model based on additional historical transaction data.

2. The method of claim 1, wherein determining the first probability value and the second probability value comprises:
    generating a feature vector based on data associated with the account; and
    providing the feature vector as input into the user-specific machine learning model, the user-specific machine learning model providing the first probability value and the second probability value as output based on the feature vector.

3. The method of claim 1, wherein the recommendation time to transmit the recommendation is a predetermined number of days prior to the first period of time.

4. The method of claim 1, wherein the completed transaction is purchasing the item listed by an online service and the subsequent transaction is repurchasing the item.

5. The method of claim 1, wherein the completed transaction is purchasing the item listed by an online service and the subsequent transaction is scheduling a service related to the item.

6. The method of claim 1, wherein the user-specific machine learning model comprises a classification model that provides the probability values to a set of labels associated with the various periods of time.

7. The method of claim 1, wherein the recommendation message displays an amount of time that has passed since the past transaction and a selectable option to view one or more listings associated with the subsequent transaction.

8. The method of claim 1, wherein the recommendation message comprises a text message that displays an amount of time that has passed since the past transaction, an image of the item, and a selectable option to view data associated with the subsequent transaction.

9. A system comprising:
    one or more computer processors; and
    one or more computer-readable mediums storing instructions that, when executed by the one or more computer processors, cause the system to perform operations comprising:
        training, using historical transaction data, a user-specific machine learning model that identifies probability values for a subsequent transaction by a user to occur at various periods of time, the training including generating vector representations based on the historical transaction data, historical transaction data associated with an account of the user being weighted higher for the training one or more of the vector representations being generated based on features describing the account including a geographic location associated with the account;
        identifying the account as being associated with a completed transaction for an item, the completed transaction having occurred at a transaction time;
        applying data associated with the completed transaction to the user-specific machine learning model to determine a first probability value and a second probability value, the first probability value indicating a likelihood that the account will perform the subsequent transaction associated with the item during a first period of time after the transaction time and the second probability value indicating a likelihood that the account will perform the subsequent transaction associated with the item during a second period of time after the transaction time;

determining, based on the first probability value being a highest probability value compared to the second probability value, that the subsequent transaction for the item is likely to be performed by the account during the first period of time after the transaction time;

determining a recommendation time to transmit a recommendation based on the first period of time and the transaction time;

transmitting a recommendation message to a contact identifier associated with the account at the recommendation time, the recommendation message providing a recommendation to perform the subsequent transaction for the item; and retraining the user-specific machine learning model based on additional historical transaction data.

10. The system of claim 9, wherein determining the first probability value and the second probability value comprises:

generating a feature vector based on data associated with the account; and providing the feature vector as input into the user-specific machine learning model, the user-specific machine learning model providing the first probability value and the second probability value as output based on the feature vector.

11. The system of claim 9, wherein determining the first probability value and a second probability value based on the historical transaction data comprises:

applying a first weight to a first subset of the historical transaction data that is associated with the account; and applying a second weight to a second subset of the historical transaction data that is associated with other accounts of an online service, the first weight being higher than the second weight.

12. The system of claim 9, wherein the completed transaction is purchasing the item listed by the online service and the subsequent transaction is repurchasing the item.

13. The system of claim 12, wherein the completed transaction is purchasing the item listed by the online service and the subsequent transaction is scheduling a service related to the item.

14. A method, performed by one or more processors, comprising:

training, using historical transaction data, a user-specific machine learning model that identifies probability values for a subsequent transaction by a user to occur at various periods of time, the training including generating vector representations based on the historical transaction data, historical transaction data associated with an account of the user being weighted higher for the training;

identifying the account as being associated with a completed transaction for an item, the completed transaction having occurred at a transaction time, the completed transaction comprising purchasing the item listed by an online service and the subsequent transaction comprising scheduling a service related to the item;

applying data associated with the completed transaction to the user-specific machine learning model to determine a first probability value and a second probability value, the first probability value indicating a likelihood that the account will perform the subsequent transaction associated with the item during a first period of time after the transaction time and the second probability value indicating a likelihood that the account will perform the subsequent transaction associated with the item during a second period of time after the transaction time;

determining, based on the first probability value being a highest probability value compared to the second probability value, that the subsequent transaction for the item is likely to be performed by the account during the first period of time after the transaction time;

determining a recommendation time to transmit a recommendation based on the first period of time and the transaction time;

transmitting a recommendation message to a contact identifier associated with the account at the recommendation time, the recommendation message providing a recommendation to perform the subsequent transaction for the item; and retraining the user-specific machine learning model based on additional historical transaction data.

15. The method of claim 14,
wherein one or more of the vector representations are generated based on features describing the account including a geographic location associated with the account.

16. The method of claim 14, wherein determining the first probability value and the second probability value comprises:

generating a feature vector based on data associated with the account; and providing the feature vector as input into the user-specific machine learning model, the user-specific machine learning model providing the first probability value and the second probability value as output based on the feature vector.

17. The method of claim 14, wherein the recommendation time to transmit the recommendation is a predetermined number of days prior to the first period of time.

18. The non method of claim 14, wherein determining the first probability value and a second probability value based on the historical transaction data comprises:

applying a first weight to a first subset of the historical transaction data that is associated with the account; and applying a second weight to a second subset of the historical transaction data that is associated with other accounts of an online service, the first weight being higher than the second weight.

* * * * *